US012339824B2

(12) United States Patent
Kinion (10) Patent No.: US 12,339,824 B2
(45) Date of Patent: Jun. 24, 2025

(54) APPEND-ONLY OPTIMIZED DATABASE USING SORTED RADIX TRIES

(71) Applicant: Kenneth Kinion, Melbourn, FL (US)

(72) Inventor: Kenneth Kinion, Melbourn, FL (US)

( * ) Notice: Subject to any disclaimer, the term of this patent is extended or adjusted under 35 U.S.C. 154(b) by 5 days.

(21) Appl. No.: 18/373,610

(22) Filed: Sep. 27, 2023

(65) Prior Publication Data

US 2025/0103574 A1  Mar. 27, 2025

(51) Int. Cl.
*G06F 16/22* (2019.01)
*G06F 16/18* (2019.01)
*G06F 16/28* (2019.01)

(52) U.S. Cl.
CPC ...... *G06F 16/2246* (2019.01); *G06F 16/1805* (2019.01); *G06F 16/28* (2019.01)

(58) Field of Classification Search
CPC ... G06F 16/2246; G06F 16/28; G06F 16/1805
USPC ......................................................... 707/797
See application file for complete search history.

(56) References Cited

U.S. PATENT DOCUMENTS

| 7,584,298 | B2 | 9/2009 | Klinker | |
| 7,664,873 | B1* | 2/2010 | Ghosh | H04L 41/14 709/224 |
| 7,864,776 | B2 | 1/2011 | Laamanen | |
| 8,386,421 | B2 | 2/2013 | Reid | |
| 8,386,526 | B2* | 2/2013 | Shinjo | G06F 16/90344 707/706 |
| 8,909,610 | B2 | 12/2014 | Reid | |
| 9,225,772 | B2* | 12/2015 | Lui | H04L 43/065 |
| 9,594,786 | B2 | 3/2017 | Marathe | |
| 9,659,047 | B2 | 5/2017 | Sharma | |
| 9,710,501 | B2 | 7/2017 | Walker | |
| 9,760,625 | B2 | 9/2017 | Hazel | |
| 10,025,903 | B2 | 7/2018 | Li | |
| 10,318,585 | B2 | 6/2019 | Schatzl | |
| 10,795,865 | B2 | 10/2020 | Raja | |
| 10,868,674 | B2* | 12/2020 | Beecham | H04L 9/0637 |
| 10,983,909 | B2 | 4/2021 | Gupta | |
| 11,113,270 | B2 | 9/2021 | Paduroiu | |
| 11,308,058 | B1 | 4/2022 | Jiang | |
| 11,347,741 | B2 | 5/2022 | Bauer | |
| 11,449,508 | B2 | 9/2022 | Potharaju | |
| 11,455,302 | B2 | 9/2022 | Dash | |
| 11,561,948 | B1 | 1/2023 | Winslow | |
| 11,567,906 | B2 | 1/2023 | Potharaju | |
| 2003/0130981 | A1* | 7/2003 | Nehru | G06F 16/2246 |
| 2007/0094313 | A1* | 4/2007 | Bolotin | G06F 16/322 |
| 2010/0174692 | A1 | 7/2010 | Meyer | |
| 2010/0174741 | A1* | 7/2010 | Shinjo | G06F 16/322 707/769 |

(Continued)

*Primary Examiner* — Giovanna B Colan (57) ABSTRACT

A system stores data in sorted radix tries in an append-only, disk-optimized database. Sorted radix tries are one of the most space-efficient ways to store hierarchical data and have excellent storage and access characteristics for enormous sets of keys. The append-only nature of the database makes it ideal for storing huge volumes of generated data, such as IP addresses, DNS data, log messages, activity logs, data measurements, and transaction histories, that are inserted in batches or aggregated over time. The organization of data in the database enables it to be queried particularly efficiently, even in low-memory and low-computing resource environments.

18 Claims, 4 Drawing Sheets

(56) References Cited

U.S. PATENT DOCUMENTS

| | | | | |
|---|---|---|---|---|
| 2015/0248449 A1* | 9/2015 | Tsirkin | ............... | G06F 16/9027 |
| | | | | 707/693 |
| 2017/0242855 A1* | 8/2017 | Futamura | ............ | G06F 16/2246 |
| 2018/0181590 A1* | 6/2018 | Raja | ...................... | G06F 16/182 |
| 2018/0300377 A1* | 10/2018 | Paidar | ................. | G06F 16/2456 |
| 2019/0279247 A1* | 9/2019 | Finken | ................. | H04L 9/0637 |
| 2019/0288850 A1* | 9/2019 | Beecham | ............ | G06F 21/6209 |
| 2019/0324954 A1 | 10/2019 | Sharma | | |
| 2019/0384530 A1* | 12/2019 | Twitto | ................... | G06F 3/0659 |
| 2022/0382674 A1 | 12/2022 | Wang | | |
| 2023/0022756 A1 | 1/2023 | Bauer | | |
| 2023/0037619 A1 | 2/2023 | Terlecki | | |
| 2023/0246844 A1* | 8/2023 | Beecham | .............. | H04L 9/3242 |
| | | | | 709/227 |
| 2023/0333983 A1* | 10/2023 | Bikonda | ............. | G06F 11/2056 |

* cited by examiner

APPEND-ONLY OPTIMIZED DATABASE USING SORTED RADIX TRIES

BACKGROUND

There is a well-recognized need to store and search massive datasets, such as those containing IP addresses and DNS entries, efficiently. The ever-growing need for quick access to an expanding body of information has led to the development of various technologies for storing such data. Some examples of existing systems for addressing this need include:

Elasticsearch: Elasticsearch is a search engine based on Lucene, designed for horizontal scalability, and is capable of handling massive amounts of data. It provides a distributed architecture that allows horizontal scaling and provides fast search results.

Apache Hadoop: Apache Hadoop is a distributed computing platform designed to manage and store massive amounts of data. It provides a system for storing, processing, and analyzing large data sets in a distributed environment.

Apache Solr: Apache Solr is an open-source search engine that provides full-text search, hit highlighting, faceted search, and real-time indexing. It is a standalone search server that provides distributed search and indexing capabilities.

Apache Cassandra: Apache Cassandra is a distributed NoSQL database that provides high scalability, availability, and performance. It is designed to handle massive amounts of data across multiple datacenters and cloud regions.

Neo4j: Neo4j is a graph database designed to store and manage hierarchical data efficiently. It provides a rich set of APIs and query languages that allow data to be searched and analyzed in real-time.

More generally, B-trees have become a popular choice for storing massive datasets because they offer a balanced and self-regulating data structure that allows efficient insertion, deletion, and search operations. They are particularly useful for storing large amounts of data on disk, as they can efficiently reduce the number of disk accesses required for each operation. Some examples of commercial systems that use B-trees are Oracle Database, Apache Cassandra, PostgreSQL, Google Bigtable, and SQLite.

While B-trees boast several advantages, they also come with their own set of limitations. One significant drawback of B-trees is that they require a large amount of memory for their operation, which can be a challenge when working with massive datasets. Additionally, B-trees can become unbalanced if the data distribution changes significantly over time, leading to degraded performance. Finally, B-trees are not the most efficient data structure for range queries, as they may require traversing multiple nodes to retrieve the desired data.

What is needed, therefore, are improved techniques for storing and accessing massive datasets efficiently.

SUMMARY

A system stores data in sorted radix tries in an append-only, disk-optimized database. Sorted radix tries are one of the most space-efficient ways to store hierarchical data and have excellent storage and access characteristics for enormous sets of keys. The append-only nature of the database makes it ideal for storing huge volumes of generated data, such as IP addresses, DNS data, log messages, activity logs, data measurements, and transaction histories, that are inserted in batches or aggregated over time. The organization of data in the database enables it to be queried particularly efficiently, even in low-memory and low-computing resource environments.

Other features and advantages of various aspects and embodiments of the present invention will become apparent from the following description and from the claims.

DETAILED DESCRIPTION

A trie is a tree-like data structure that is used to store a dynamic set of data (e.g., strings), including keys or key-value pairs, where the keys are usually strings. The value of the key (e.g., the string) is distributed across the trie, which means each node of the trie typically corresponds to a single unit (e.g., byte or character) of the key. A "radix trie" is a special type of trie in which a node can represent an entire string fragment (more than one character), thereby compressing paths and making radix tries more space-efficient than generic tries. (Note that the description herein refers to nodes "representing," "containing," "corresponding to," and "being associated with" data, such as characters and strings, interchangeably.)

Figure 1:
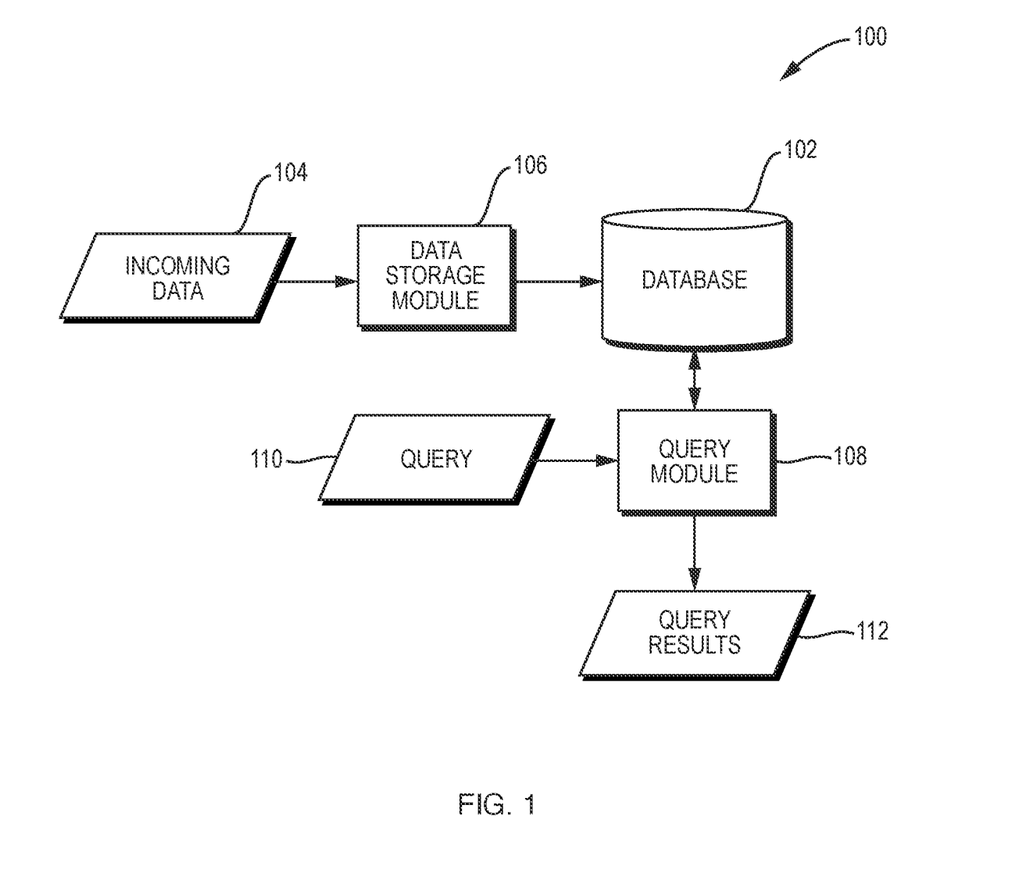
FIG. 1 is a dataflow diagram of a system which stores data in sorted radix tries in an append-only, disk-optimized database according to one embodiment of the present invention.

Referring to FIG. 1, a dataflow diagram is shown of a system 100, implemented according to one embodiment of the present invention, which stores data efficiently in sorted radix tries in an append-only, disk-optimized database 102. The database 102 stores data in sorted radix tries because they are one of the most space-efficient ways to store hierarchical data and have excellent storage and access characteristics for enormous sets of keys. The database 102 is an append-only database, making it ideal for storing huge volumes of generated data, such as IP addresses, DNS data, log messages, activity logs, data measurements, and transaction histories, that are inserted in batches or aggregated over time.

Append-Only Databases

As is well-known, an append-only database is a type of database in which data is only added, never deleted or updated. Append-only databases are typically used in scenarios where the full history of data changes needs to be maintained. This approach is particularly beneficial for systems where data is accumulated over time and must be kept immutable. A common goal of append-only databases is to maintain a historical record that is immutable, reliable, and can be used to reproduce any prior state or perform trend analysis over time. Some common uses of append-only databases include the following:

(1) Event Sourcing: This is a design pattern in which changes to application states are stored as a sequence of events. These events are appended to an event store database and can be replayed to reconstruct past states. This pattern is often used in microservices architectures.

(2) Logging: Many logging systems use append-only databases to store logs. This is because logs are typically generated in large volumes and must be kept in the order they were generated, both of which are strengths of append-only databases. These logs can then be used for debugging, auditing, or analyzing system performance.

(3) Time-Series Data: Time-series data (such as sensor data, stock prices, and user clickstreams) are often stored in append-only databases. This data is typically inserted in time order and is rarely updated or deleted, making append-only databases a great fit.

(4) Immutable Ledgers (e.g., blockchain): In blockchain technology, data about transactions is stored in an append-only ledger. Once a block is added to the chain, it is not altered or removed. This immutability is a core characteristic of blockchain and is enabled by using an append-only database.

(5) Version Control Systems: Version control systems, such as Git, internally use an append-only database model. Changes (commits) are always appended, ensuring a complete history of changes to the codebase. This makes it possible to revert to any previous state.

(6) Data Warehousing and Business Intelligence: In these fields, historical data is crucial for trend analysis, forecasting, and decision making. An append-only database can provide a complete and immutable history of business data, enabling more accurate and reliable analyses.

The above are merely some examples of common uses of append-only databases to which embodiments of the present invention may be applied. Embodiments of the present invention, such as the system 100 and the database 102, however, are not limited to use with the example use cases listed above.

Some examples of well-known NoSQL database systems, which may use permissions and/or Access Control List (ACL) rules to implement append-only databases, include Apache Cassandra, Google Bigtable, Azure Cosmos DB, Amazon DynamoDB, MongoDB, and Oracle NoSQL Database. Although embodiments of the present invention may, for example, use any such system(s) to perform various functions disclosed herein, embodiments of the present invention are agnostic to and not limited to use with any particular database system. In fact, although the term "database" is used in connection with the database 102, more generally the database 102 may be any kind of data store capable of performing the functions disclosed herein, whether or not that data store falls within any particular meaning of the term "database."

The database 102 may, for example, be implemented as a NoSQL (Not Only SQL) database, which is a type of database management system that differs from traditional relational databases (SQL databases) in terms of data model, storage architecture, and query language. In particular, NoSQL databases are designed to handle large volumes of unstructured or semi-structured data, provide high scalability and performance, and offer flexible data models. For example, NoSQL databases use various data models such as key-value, document, columnar, or graph models. These models allow for flexible and dynamic schema designs, accommodating different data types and structures. Furthermore, NoSQL databases are built to scale horizontally, meaning they can handle increasing amounts of data by adding more servers to a cluster. This scalability is achieved by distributing data across multiple nodes and employing techniques such as sharding and replication. NoSQL databases often prioritize performance and can handle high-speed data ingestion and retrieval. They typically optimize for read and write operations, making them suitable for use cases that require real-time data processing and low latency. In addition, NoSQL databases offer more flexibility in handling data that doesn't fit well into a tabular, structured format. For example, they can store and query semi-structured and unstructured data, making them suitable for scenarios like content management systems, social media analytics, IoT applications, and real-time data feeds. Examples of commercially-available NoSQL databases which may be used to implement the database 102 (in whole or in part), include systems such as MongoDB (document-oriented), Cassandra (columnar), Redis (key-value), and Neo4j (graph).

Disk-Optimized Database

The database 102 may be disk-optimized, which means that the database is designed to use the storage disk in a highly efficient way. This optimization is beneficial because disk I/O (input/output) operations are generally much slower than in-memory operations. Some common features of disk-optimized databases are one or more of the following:

(1) Efficient Data Layout: A disk-optimized database organizes data on the disk in a way that minimizes the number of disk I/O operations required to read or write data. For instance, related data might be stored close together on the disk to minimize the need for disk seeks during read operations.

(2) Indexing: Indexing is a way of creating a "map" of data, which can speed up data retrieval. Disk-optimized databases typically use efficient indexing strategies to locate data quickly without having to scan the entire disk.

(3) Page Caching: Databases often use a technique called "page caching" to keep frequently accessed data in memory, reducing the need for slow disk I/O operations.

(4) Data Compression: Disk-optimized databases may use compression techniques to reduce the amount of disk space that data occupies, leading to more efficient disk I/O.

(5) Write Buffering: Write operations might be buffered and performed in batches to reduce the overhead of disk I/O operations.

(6) Query Optimization: The database might use sophisticated query optimizers to determine the most efficient way to execute a query, reducing the amount of data that needs to be read from the disk.

The database 102 may, for example, have any one or more of the features listed above. New data may be added to an append-only, disk-optimized database, such as the database 102, in a way that minimizes disk I/O operations and makes efficient use of disk space.

Storing Data in Sorted Radix Tries

Some or all of the data in the database 102 may be stored in one or more sorted radix tries (also referred to as sorted radix trees). A radix trie is a type of data structure that is used to store associative arrays. More specifically, it provides a mechanism for storing and retrieving pairs of "keys" and "values." An associative array makes it possible to look up the values of keys. However, if the number of keys is very large, performing such a lookup can be computationally expensive. To address this problem, radix tries organize keys in a tree-like structure, in which each path from the root of the tree to a leaf represents a key. This makes searching for a key very efficient, because retrieving the value associated with a key only requires following the path that represents the key being searched for. A sorted radix trie is a radix trie in which the keys are stored in sorted order. This makes it even easier to find a specific key, because paths in the tree may be followed in order until the key being searched for is found.

As mentioned above, some or all of the data in the database 102 may be stored in the form of sorted radix tries because sorted radix tries are a very space-efficient way to store large sets of keys and they have excellent performance characteristics for both storing and retrieving data, making them ideal for applications that need to handle large volumes of data. The database 102 may, for example, include at least 1 million unique keys, at least 10 million unique keys, at least 100 million unique keys, at least 1 billion unique keys, at least 10 billion unique keys, and least 100 billion unique keys, at least 1 trillion unique keys, at least 10 trillion unique keys, or at least 100 trillion unique keys. A single trie may, for example, include at least 1 MB, at least 1 GB, at least 1 TB, at least 1 PB, at least 1 EB, or at least 16 EB.

Nodes in radix tries in the database 102 may have associated metadata. The metadata for a node in a radix trie in the database may be stored in the radix trie itself. A node may be a branch node (i.e., have at least one child node) or a non-branch node (i.e., have zero child nodes). A radix trie in the database 102 may include any number of branch nodes and any number of non-branch nodes, in any combination.

A non-branch node of a radix trie in the database 102 may include some or all of the following metadata:
(1) a radix, having zero or more bytes;
(2) node value data, containing the node's value (in a key-value pair), having zero or more bytes.

A branch node of a radix trie in the database 102 may contain some or all of the following metadata:
(1) a header (having zero, one, or two bytes) representing the length of the radix;
(2) a radix (having zero or more bytes);
(3) a count (having 0-9 bytes), storing the total number of unique keys below the branch node;
(4) an array of prefixes of the child nodes of the branch node, which may be stored using bit compression;
(5) an array of offsets from the location of the branch node to the locations of the branch nodes' child nodes, which may be stored using bit compression;
(6) an array (also referred to herein as the "node metadata array") containing node metadata, state, and hints, which may, for example:
be stored using bit compression;
be equal in length to the offset locations from the branch node to its child nodes;
contain information about the branch node's child nodes, such as, for each child node: whether the child node is a branch node; whether the child node has a radix; and whether the child node is a terminating node.
(7) if the node is a terminating node, data stored in or otherwise associated with the node (also referred to herein as the "node's data").

The particular numbers of bytes listed above for storing various types of node metadata are merely examples and do not constitute limitations of the present invention.

As mentioned above, each branch node may contain an array that describes the prefixes of the branch node's child nodes. The numeric value of the prefix of a child node is the next sequence in the path in the trie, the traversal of which forms the unique key. This array may, for example, employ prefix compression. Storing such an array may make it possible to perform key/value lookups in the trie more quickly than without such an array, by avoiding the need to traverse deeper into the trie to find such keys/values. Furthermore, because the elements of the array are in strictly-increasing order, embodiments of the present invention may store the elements of the array using prefix compression (i.e., store only the difference (delta) between each element and the preceding element in the array). Embodiments of the present invention may apply (e.g., in addition to prefix compression) one or more bit compression methods to the deltas and store the resulting prefix-compressed and/or bit-compressed data in the array, thereby resulting in a very compact encoding format.

The array of offsets from the current (branch) node to the current node's child nodes may, for example, be stored in strictly-increasing order and may match the sort order of the values of the child nodes. This array may, for example, be stored using prefix compression; because the elements of the array are in strictly-increasing order, embodiments of the present invention may store only the difference between each element and the preceding element in the array. As a concrete example, if the offset values to be stored in the array are 0001, 0011, and 0111, such values may be stored in successive array elements as 0001, 1, and 10, where 1 and 10 are examples of what are referred to here as differences or deltas. Embodiments of the present invention may also apply one or more bit compression methods to the deltas and store the resulting prefix-compressed and/or bit-compressed data in the array of offsets, thereby resulting in a very compact encoding format.

Furthermore, storing the array of offsets from a branch node to its child nodes may have a variety of advantages. For example, if the radix trie is stored on disk (as opposed to in-memory), using offsets can be an efficient way to navigate the trie structure. When reading a branch node from disk, it is easy to compute the position of the branch node's child nodes by adding the offsets of those child nodes to the location of the branch node. Offsets are also valuable when serializing the trie, because when serializing data to send it over a network or save it to disk, pointers (memory addresses) are often meaningless or unusable in the receiving context. Offsets, however, can remain consistent and useful. As yet one more example, it may be possible to store offsets more compactly than full pointers.

The node metadata array may have a variety of advantages. For example, storing information about whether a branch node's child node is itself a branch node can help to quickly determine the types of operations that can be performed on the child node, without needing to access the child node directly. For instance, if the child is not a branch node, certain traversal or manipulation operations might be skipped or optimized. As another example, storing information about whether a branch's child node has a radix may speed up traversal operations by eliminating the need to access the child node directly to determine whether it has a radix. This may be especially efficient if the trie is deep or densely population. Storing information about whether a branch's child node is a terminating node may assist, for example, in search operations and other operations that leverage the structure of the trie.

Embodiments of the present invention may apply one or more bit compression methods when storing any of the data described above, such as some or all of the array of prefixes, the array of offsets, and the node metadata array, and store the resulting compressed data in the trie, thereby resulting in a very compact encoding format.

A node's data may be of arbitrary type, and different nodes in a trie may have different types. A node's data may itself be a trie (e.g., a sorted radix trie), thereby effectuating a nested range.

Any node in a sorted radix trie in the database 102 may, for example, have any number of child nodes. In some embodiments, there may be a limit to the number of child nodes that a node may have. This is referred to as the "maximum expanse size." In some embodiments, the maximum expanse size is 256. In other embodiments, the maximum expanse size is 65536.

Embodiments of the present invention may apply one or more lossless array compression techniques to any array of integer values disclosed herein. Examples of such lossless array compression techniques include: variable bit-width values within the array (e.g., compression of the leading bits); run-length encoding (RLE); zero-offset fixed-width value encoding; and non-zero-offset fixed-width value encoding. Embodiments of the present invention may, for example, dynamically select any one or more such techniques to apply to an array (e.g., at the time of serializing such an array), and then apply the selected technique(s) to compress the array, thereby generating a compressed array.

When compressing an array, embodiments of the present invention may dynamically select one or more lossless compression techniques in any of a variety of ways, such as the following. Arrays of numbers may be stored more efficiently by using a variable number of bytes (and bits) to store each value. To do this, embodiments of the present invention may break an array down into "frames" of similarly-sized values, and store each such frame using any of the lossless array compression techniques disclosed herein. For example, an array of numbers may include a plurality of frames, each of which is stored using one these frame types:

Literal integer (7 bits)—1B
1-bit arrays, offset from 0 (i.e., [0, 1]); length: 5 minimum, 256 maximum (3B-32B);
1 bit arrays, offset from 1 (i.e., [1, 2]); length: 5 minimum, 256 maximum (3B-32B);
1 bit arrays, offset from 2 (i.e., [2, 3]); length: 5 minimum, 256 maximum (3B-32B);
2 bit arrays (i.e., [0-3]); length: 7 minimum, 256 maximum (4B-66B);
4 bit arrays (i.e., [0-15]); length: 3 minimum, 32 maximum (2B-17B);
4 bit Run Length Encoding (RLE) arrays (i.e., [0-15]); length: 2 minimum, 255 maximum (2B);
Large integer (e.g., [128–(2^63)–1]; length: 1 (1-9B).

As a result, an array may include a plurality of frames stored using two or more of the frame types above (i.e., one of the frames may be stored using one of the frame types above, and another one of the frames may be stored using a different one of the frame types above). Furthermore, if the array of numbers is strictly-increasing, the array may store only the first (lowest) number and the subsequent deltas between consecutive numbers in the array.

Many existing database systems use B-trees (and their variants) to store data. Examples of such database systems include relational databases, such as InnoDB (MySQL, MairaDB) and PostgreSQL, as well as NoSQL databases such as MongoDB. In contrast, embodiments of the present invention use more space-efficient radix tries because radix tries do not support modification or deletion of individual records after insertion. See Table 1 for a brief comparison of some of the key features of B-tree and sorted radix trie data structures.

TABLE 1

| Feature | B-Trees (and variants) | Sorted Radix Tries |
| --- | --- | --- |
| Key ordering | Sorted | Sorted |
| Storage needs | Higher | Much lower |
| Search time | log(n) | log(n) |
| Append-only | No | Yes |
| Balanced | Yes | No |

Data Storage Module

The system 100 also includes a data storage module 106. The data storage module 106 receives incoming data 104 (e.g., data of any of the kinds listed above) and stores the incoming data 104 in sorted radix tries in the database 102. The incoming data 104 may take any of a variety of forms. For example, the incoming data 104 may include structured data, such as columnar (e.g., CSV) data, key/value pairs, a simple set of keys (without values), and/or unstructured (e.g., JSON) data.

Figure 2:
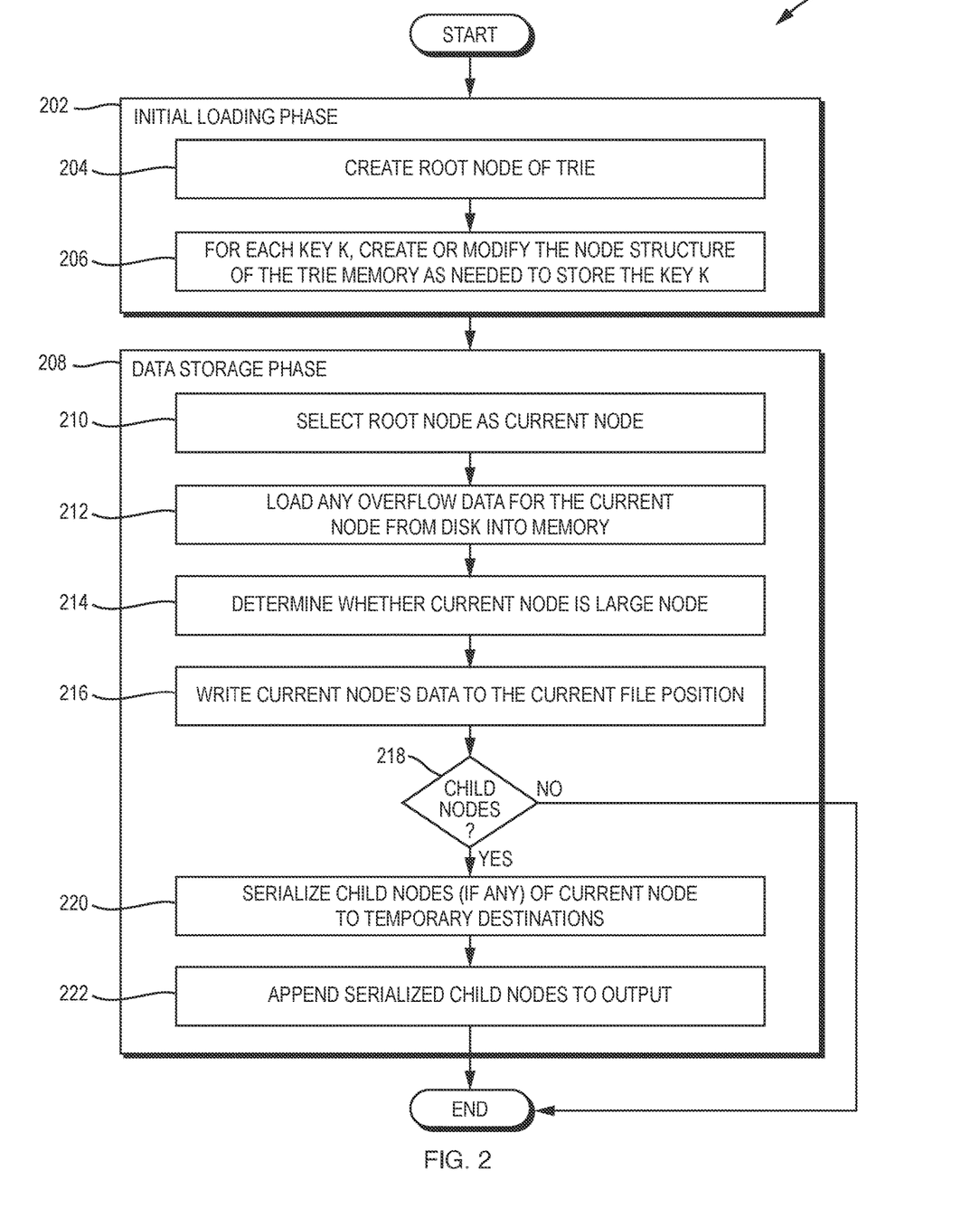
FIG. 2 is a flowchart of a method performed by the system of FIG. 1 to store data in a sorted radix trie according to one embodiment of the present invention.

The data storage module 106 may, for example, store the incoming data 104 in one or more tries (i.e., one or more sorted radix tries) in the database 102. Although some of the description herein may refer to "the trie," it should be understood that any such description is applicable to storing data in, and retrieving data from, one or more tries in the database 102. Referring to FIG. 2, a flowchart is shown of a method 200 that may be performed by the data storage module 106 to store some or all of the incoming data 104 (which may contain a plurality of key/value pairs) in a trie in the database 102 in two phases according to one embodiment of the present invention as follows.

In a first phase (also referred to herein as the initial loading phase 202), the data storage module 106 may create a root node of the trie (FIG. 2, operation 204). As described in more detail below, all key/value pairs to be stored in the trie (e.g., all key/value pairs in the incoming data 104) are stored in the root node or its descendants. For each key K to be stored in the trie, the data storage module 106 may create or modify the node structure of the trie in memory as needed to store the key K (FIG. 2, operation 206), which may include:

(1) Creating a new node to be the current node and assigning that node to the root node of the trie. The "current node" refers to the node in the trie that is currently being processed, and may, for example, be implemented as a pointer to that node.
(2) Identifying the longest shared prefix among the key K and all keys stored in child nodes of the current node. Note that the "immediate prefix value" is that part of the key K that comes after the longest shared prefix identified in this step.
(3) Updating the radix of the current node to be the longest shared prefix identified in step (2).
(4) If no child node of the current node has a prefix that matches the immediate prefix value of key K, then create a new child node of the current node, and store the immediate prefix value of key K in the new child node.
(5) Determine whether the combination of the current prefix (i.e., the portion of key K that has been matched so far by traversing nodes in the trie from the root node to the current node) and the current radix (i.e., the radix of the current node) match the entire key K. If so, then the current node is the node in which key K should be stored, and the data storage module 106 stores the value of key K in the current node.

(6) If there was not a match between key K and the combination of the current prefix and the current radix, then the data storage module 106 may trim the radix of the current node and the prefix of the matching child node (i.e., the part of key K that leads up to and includes the current node's radix) from key K, and add the remaining part of key K (i.e., the part of key K that remains after trimming) and its associated data value to the matching child node.

In some embodiments of the process described above, if, at any point, more than some threshold number of node keys and/or some threshold amount of data has been added to the trie, then the data storage module 106 may append any remaining key/value pairs to an "overflow" file on disk (not shown), rather than storing such key/value pairs in memory.

Figure 3A:
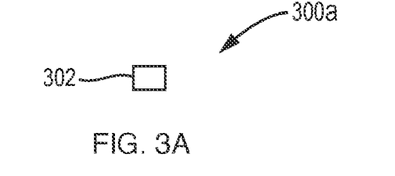
FIGS. 3A-3E are illustrations of successive states of a sorted radix trie in which the strings "abc", "abcd", "abe", and "fgh" are stored in the sorted radix trie according to one embodiment of the present invention.

Referring to FIGS. 3A-3E, diagrams are shown to illustrate the initial loading phase 202 using a simple example, in which the strings "abc", "abcd", "abe", and "fgh" are to be stored in a sorted radix trie. Referring to FIG. 3A, an initial state 300a of the sorted radix trie is shown, in which the sorted radix trie only contains a single, empty, root node 302.

Figure 3B:
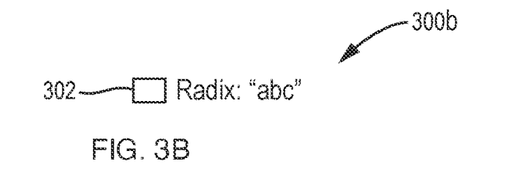

Now assume that the string "abc" is to be stored in the sorted radix trie. FIG. 3B shows a second state 300b of the sorted radix trie in which the string "abc" has been stored in the radix of the sorted radix trie's root node, because no other data have yet been stored in the sorted radix trie.

Figure 3C:
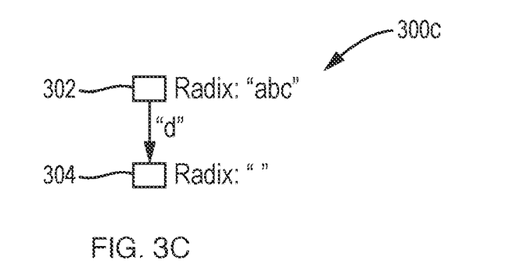

Now assume that the string "abcd" is to be stored in the sorted radix trie. FIG. 3C shows a third state 300c of the sorted radix trie in which the radix of the root node 302 remains "abc", and in which a new node 304 has been added to the sorted radix trie as a child node of the root node 302 (which is now a branch node). The string "d" has been stored as the value of the node 304, and the empty string " " has been stored as the radix of the child node 304. As a result, the third state 300c of the sorted radix trie stores both "abc" (directly in the root node 302) and "abcd" (using a combination of the root node 302 and the child node 304).

Figure 3D:
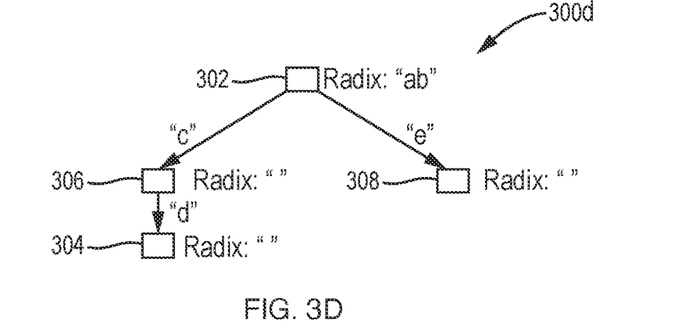

Now assume that the string "abe" is to be stored in the sorted radix trie. FIG. 3D shows a fourth state 300d of the sorted radix trie in which: (1) the radix of the root node 302 has been changed to "ab"; (2) a new node 306 has been added to the sorted radix trie as a child node of the root node 302, and "c" has been stored as the value of node 306; (3) a new node 308 have been added to the sorted radix trie as a child node of the root node 302, and "d" has been stored as the value of node 308; and (4) node 304 has been made into a child node of node 306 (which is now a branch node). As a result, the fourth state 300d of the sorted radix trie stores "abc" (using a combination of the root node 302 and node 306), "abcd" (using a combination of the root node 302, the node 306, and the node 304); and "abe" (using a combination of the root node 302 and the node 308).

Figure 3E:
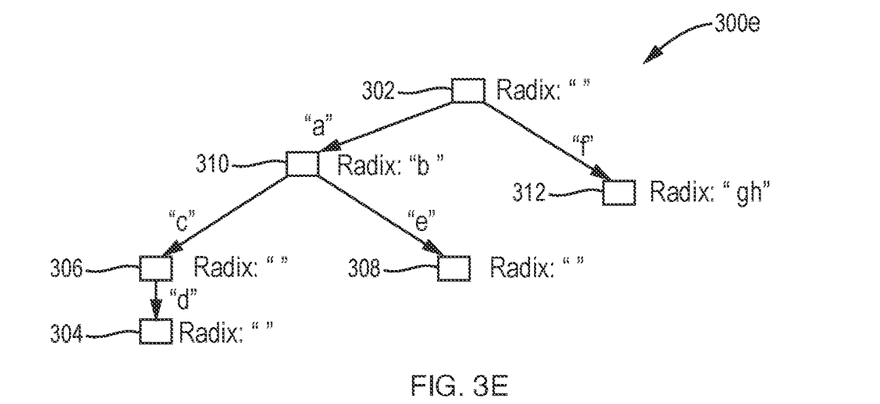

Now assume that the string "fgh" is to be stored in the sorted radix trie. FIG. 3E shows a fifth state 300e of the sorted radix trie in which: (1) the radix of the root node 302 has been changed to " " (because "fgh" has no initial characters in common with any other data previously stored in the sorted radix trie); (2) a new node 310 has been added to the sorted radix trie as a child node of the root node 302, "a" has been stored as the value of node 310, and "b" has been stored as the radix of node 310; and (3) a new node 312 has been added to the sorted radix trie as a child node of the root node 302, "f" has been stored as the value of node 312, and "gh" has been stored as the radix of the node 312. As a result, the fifth state 300e of the sorted radix trie stores "abc" (using a combination of the node 310 and node 306), "abcd" (using a combination of the node 310, the node 306, and the node 304); "abe" (using a combination of the node 310 and the node 308); and "fgh" (using node 312).

In a second phase, also referred to herein as the data storage phase 208, the data storage module 106 may perform the following steps for each node in each trie in the database 102, starting with the trie's root node (where the node being processed is referred to as the "current node" below) (FIG. 2, operation 210). In the description below, the "current file position" begins at an initial position (e.g., position zero) in the file being written, and data are then written sequentially, such that the current file position keeps advancing to the position immediately after the most recently-written data:

(1) Load any overflow data for the current node from disk into memory (FIG. 2, operation 212).

(2) Determine whether the current node qualifies as a "large" node, based on the number of child nodes of the current node (FIG. 2, operation 214). This determination may use any value as a threshold, such as 255. If the current node qualifies as a "large" node, then a flag is set that indicates that the current node is a "large" node, and that flag is written out when the metadata about each child node is written by the parent node.

(3) Write the current node's data to the current file position (FIG. 2, operation 216). Note that some applications may have custom mechanisms for processing the current node's data, such as creating tries of the kinds disclosed herein based on the node's data itself.

(4) If the current node has any child nodes (FIG. 2, operation 218), then serialize each child node of the current node, in sorted order, by their prefix values, to temporary destinations on disk (FIG. 2, operation 220), by:

(a) For each such child node (if any), serializing the child node by performing steps (1)-(4) in this process, with that child node as the current node. In this process, each child node may be serialized in its entirety, then appended to the temporary destination. If there are no child nodes, then this step is not performed.

(b) Recording the node header of the current node.

(c) Recording the node radix of the current node.

(d) Recording the count of immediate child nodes of the current node.

(e) Recording the child prefix value array (sorted: uses "prefix compression").

(f) Recording the node metadata array.

(g) Recording the child offset array (sorted; uses "prefix compression").

(h) Appending the serialized child nodes (from the temporary destination) generated in step (4)(a) to the output (FIG. 2, operation 222).

The data storage module 106 may, for example, receive and store the incoming data 104 in one batch, or in one or more batches over time. Even if all of the incoming data 104 exists at a particular time, the data storage module 106 may process and store the incoming data 104 into the database 102 in one or more batches.

Furthermore, although the incoming data 104 is shown in FIG. 1 as a single set of data for ease of illustration, the incoming data 104 may be updated over time in any of a variety of ways. For example, the incoming data 104 may include initial incoming data, which the data storage module 106 may store in the database 102 using any of the techniques disclosed herein. Additional data may then be added to the incoming data 104 at one or more times. The data storage module 106 may store some or all of that additional data into the database 102 using any of the techniques disclosed herein. The data storage module 106 may, for example, store such additional data from the incoming data 104 into the database 102 in response to detecting that such additional data has been added to the incoming data 104. As another example, the data storage module 106 may store such additional data from the incoming data 104 into the database 102 by repeatedly (e.g., periodically) polling the incoming data 104 for any additional data. Some or all of the incoming data 104 may be pushed to the data storage module 106 for storage into the database 102. The data storage module 106 may pull some or all of the incoming data 104 for storage into the database 102.

The data storage module 106 may, for example, serialize the incoming data 104 (e.g., in one or more batches) as it is received, and merge content within the incoming data 104 over time. Such merging may, for example, reduce storage space within the database 102 and improve query efficiency of the database 102, thereby requiring significantly less hardware resources to store and retrieve data from the database 102 than is typical for comparatively-large databases.

Such serialization may be performed in any of a variety of ways, and may, for example, be performed differently for different data types and/or different usage patterns. Such serialization may be used, for example, to store bidirectionally-indexed columnar data, to store large amounts (e.g., multiple years) of Certificate Transparency Stream JSON logs with indexes on select fields, and summarizing network traffic heuristics at scale for a select dimension.

The data storage module 106 may store serialized data in any of a variety of serialized data formats, such as JSON (JavaScript Object Notation), XML (extensible Markup Language), protobuf (protocol buffers), Avro, MessagePack, CSV (comma separated values), or YAML (YAML Ain't Markup Language).

The data storage module 106 may, for example, store a verbatim copy of some or all of the incoming data 104 in the database 102. Alternatively, for example, the data storage module 106 may reduce, transform, and/or aggregate some or all of the incoming data 104 and store the resulting reduced, transformed, and/or aggregated data in the database 102. For example, if only a subset of the incoming data 104 is valuable for subsequent querying, the data storage module 106 may store only that subset of the incoming data 104 in the database 102 and not store the remainder of the incoming data 104 in the database 102.

When the data storage module 106 stores the incoming data 104 in the database 102, the data storage module 106 may index any number of fields in the incoming data 104 and store the resulting indexes in the database 102. Examples of data types which the data storage module 106 may index include strings, signed and unsigned integers of any bit width (e.g., 8, 16, 32, and/or 64 bits), floating point numbers of any precision (e.g., 32 bits, 64 bits, and/or 80 bits), binary (e.g., binary content sorted by bit order), nil, null, and true/false. Embodiments of the present invention may, for example, be used to store IPv4, Ipv6, dates, hash sums (e.g., MD5, SHA256), and domain name data types, and to query such data.

The data storage module 106 may optimize storage of the incoming data 104 by, for example, calculating the most efficient order in which to store values during storage of the incoming data 104 by the data storage module 106 to take advantage of value deduplication.

Each node in a trie may have a corresponding state, which may be stored in the trie. The state of a node may include, for example, data representing any one or more of the following: whether the node has a radix; whether the node is a branch (i.e., has one or more children); whether the node is a "large" branch (e.g., has more than 256 children); whether the node is a terminating node (e.g., has no children); and whether the node contains an encoded total recursive child count. The "branch type" of a node refers to branch-related state of the node, such as the parts of the node's state indicating whether the node is a branch, whether the node is a large branch, and whether the node is a terminating node.

Querying the Database

Once the system 100 has stored data in the database 102, the system 100 may use a query module 108 to query the database 102 using a query 110 and thereby to retrieve data from the database 102 in the form of query results 112. The query 110 may, for example, be a domain name query, an Internet Protocol (IP) queries, a CIDR query, an integer query, a float query, a date query, a binary query, a hashtag query, or a string query.

Figure 4:
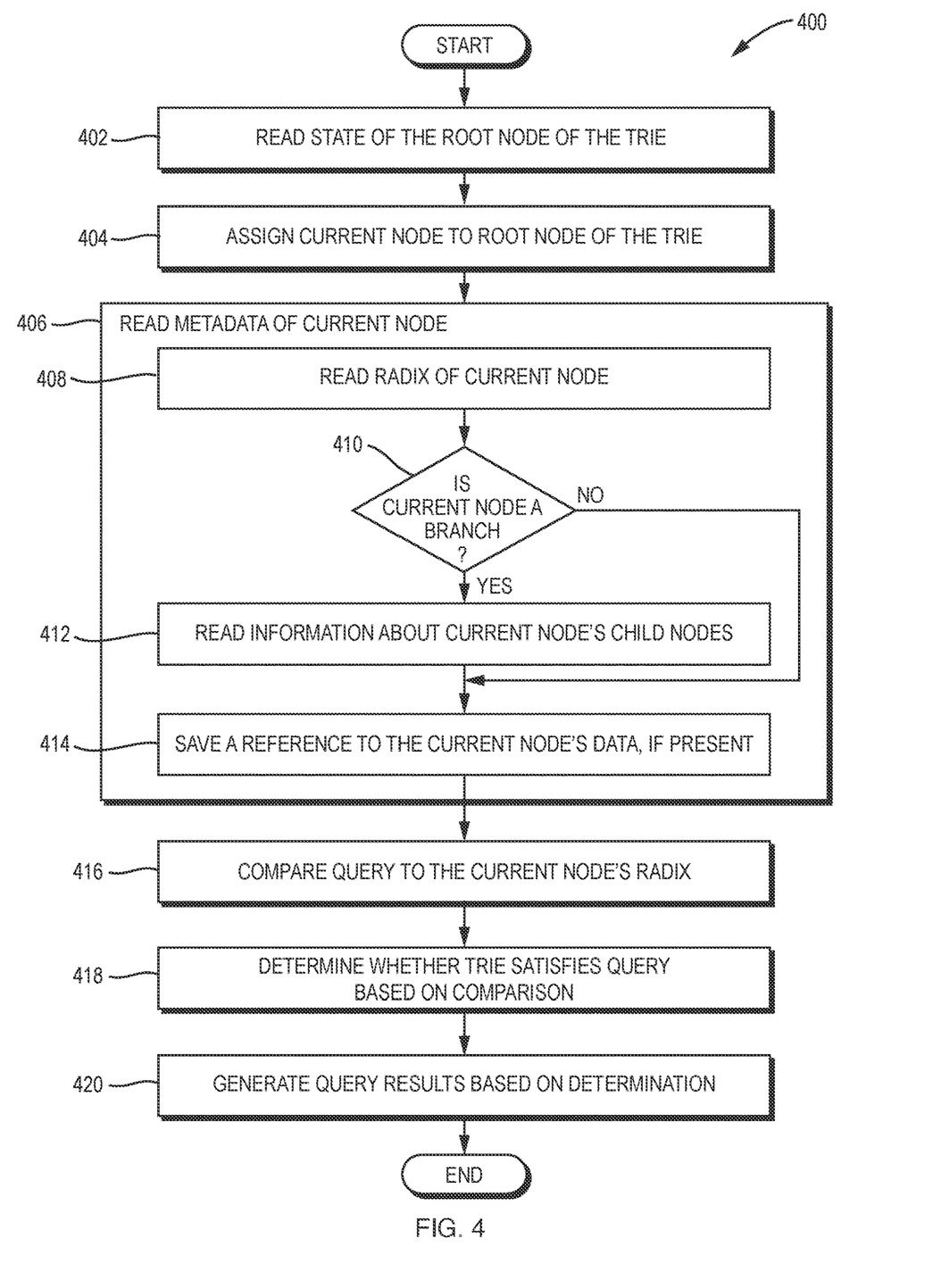
FIG. 4 is a flowchart of a method used by a query module to query a database containing a sorted radix trie using a query to produce query results according to one embodiment of the present invention.

Referring to FIG. 4, a flowchart is shown of a method 400 that is used by the query module 108 to query the database 102 (e.g., one or more sorted radix tries in the database 102) using the query 110 to produce the query results 112 according to one embodiment of the present invention. In one embodiment, the query module 108 queries the database 102 using the query 110 as follows:

(1) The query module 108 reads the state of the root node (e.g., branch type) of the serialized trie in the database 102 (FIG. 4, operation 402). The "current node" is assigned to the root node (FIG. 4, operation 404).

(2) The query module 108 may read the metadata for the current node as follows (FIG. 4, operation 406):

(a) Read the radix of the current node (FIG. 4, operation 408).

(b) If the current node is a branch (i.e., has at least one child node) (FIG. 4, operation 410), then read various information stored about the current node's child nodes from the current node, such as one or more of the following (FIG. 4, operation 412):

i. The count of child nodes of the current node.
ii. The prefixes of child nodes of the current node.
iii. The current node's metadata array.
iv. The offsets to child nodes of the current node.

(c) Save a reference to the current node's data (e.g., key values), if present (FIG. 4, operation 414). Such data may not be present if, for example, the trie is used to store keys (e.g., domain names) without corresponding values.

(d) Save data representing the rest of the structure of the trie underneath the current node. This data may include, for example, any one or more of the following: a header (when the current node is a branch); a radix (when the radix is set); a count (if given); an index or bitmap (when the current node is a branch); a type of each entry in the index/bitmap, and an offset of each entry from the previous entry.

(3) The query module 108 may compare the query 110 (e.g., key) to the radix of the current node to determine whether the query 110 matches that radix (FIG. 4, operation 416) and, more generally, determine whether the database 102 (e.g., one or more sorted radix tries in the database) satisfies the query 110 based on the determination (FIG. 2, operation 218), as follows:

If the radix of the current node is longer than the query 110, then there is no match.

If all bytes of the radix of the current node match the bytes of the query 110, then there is a match.

If the radix of the current node is shorter than the length of the query 110, then the query module 108 may:
 i. Determine that there is a match only if both of the following conditions are satisfied:
  a) all bytes of the radix of the current node match the first bytes of the query 110; and
  b) the current node contains a child node with a prefix that matches the next byte (after the radix bytes, i.e., the bytes of the key that match the radix of the current node) of the remainder of the query 110 (i.e., the portion of the key after the portion of the key that matches the prefix of the current node).
 ii. If both of the conditions above are satisfied, then the query module 108 may:
  a) shorten the length of the query 110 by [the length of the radix of the current node plus 1], to take into account the prefix byte of the child node; and
  b) read the state (e.g., branch type) of the matching node, and return to step (2) above.

The query module 108 may query the database 102 in any of a variety of ways. For example, if the database 102 includes a plurality of domain names, some or all of such domain names may be encoded to compress characters in such domain names into a smaller number of bytes (e.g., compressing 3 domain name characters into 2 bytes). In such a case, the query module 108 may, when querying domain names in the database 102, account for the fact that domain names are stored in 2-byte prefixed and look for the presence of decoded period characters within the prefixes to determine which child nodes are a match for the query 110.

The query module 108 may generate the query results 112 based on the determination performed (FIG. 4, operation 420). The query results 112 may, for example, contain the matching key, a pointer to the data stored at the matching node (the value of the matching "key"), and the length of the data stored at the matching node. The system 100 may output the query 110 to a user of the system 100 in any of a variety of ways, such as in the form of a table, a pivot table, or a stream (e.g., a socket or terminal application). The system 100 may enable the user to perform additional filtering of the query 110 after the query results 112 have been generated, without the need to query the database 102 again, such as by filtering a local copy of the query results 112. Such additional filtering may, for example, filter values of keys in the query results 112. For example, if the values of one or more keys in the query results are themselves radix tries, such additional filtering may filter such radix tries using the query 110 (and/or another query) in any of the ways disclosed herein for searching the database 102 using the query 110.

Compute and Storage Resource Implementations

The system 100 may be implemented in any of a variety of ways. In general, the system 100 may use any of a variety of compute resources to perform the computing functions disclosed herein and may use any of a variety of storage resources to perform the storage functions disclosed herein, such as to implement and store data in the database 102. Examples of some computing and storage resources that may be used to implement various aspects of the system 100 are shown below in Table 2.

TABLE 2

| Deployment Destination | System Component | |
| --- | --- | --- |
| | Compute | Storage |
| AWS | EC2 VMs | S3 |
| GCP | Compute Engine VMs | GCS |
| Azure | Azure Compute VMs | Blob storage |
| Alt Cloud/ On-Prem | VMs (e.g. ESX) or direct metal deployment | NAS or S3-compatible equivalent (e.g. Wasabi) |

The system 100 may be implemented to execute any functions disclosed herein locally or over a network. For example, the incoming data 104 may be located remotely from the database 102, and the database 102 may receive the incoming data 104 over one or more networks. Furthermore, any of the compute resources used by the system 100 may be located locally to or remotely from each other, from the incoming data 104, and/or from the database 102, and may communicate with each other over one or more networks. For example, the system 100 may include its own local compute resources, which may call on one or more remote compute resources (such as any of the examples shown above in Table 2) over one or more networks to perform their respective compute functions, and to receive compute results back from those compute resources over the one or more networks. Any network disclosed herein may be any kind of network, such as a local area network (LAN) or wide area network (WAN) using any kind(s) of network technology, topology, protocol, etc. As one example, the various data disclosed herein (such as some or all of the data in the database 102) may be stored in one or more physical or virtual Network Attached Stored (NAS) devices, in which case all read and write operations disclosed herein in connection with the data storage module 106, query module 108, and query 110 may be performed over a network. As another example, the query 110 may be sent, and the query results 112 may be received, over a network via TCP (e.g., HTTP, such as a Web Socket, encrypted socket, or an authenticated connection).

Applications and Advantages

Embodiments of the present invention may be used for any of a variety of purposes. For example, the system 100 may be used to implement a database of the Internet's infrastructure that is extensive and continuously updated. There are enormous challenges associated with storing such data, particularly cost and complexity challenges. For example, some embodiments of the system 100 are capable of parsing several terabytes (TB) of packet captures (PCAPs) into approximately 5 billion unique associations or more daily. One particular embodiment of the system 100 has been implemented to parse as much as 10 TB/hour of packet captures. Such embodiments are capable of ingesting other data sources (e.g., JSON files, CSV files, database tables, and other proprietary formats, such as Apache Parquet data) which may include hundreds of gigabytes (GB) or more daily. Existing off-the-shelf solutions all struggle to answer common threat intelligence questions (e.g., query by Classless Inter-Domain Routing (CIDR), wildcard domain, and range filtering). Embodiments of the present invention are capable of answering these common threat intelligence questions in a scalable way that is relatively inexpensive to run, by making use of the data storage mechanisms disclosed herein.

Embodiments of the present invention have a variety of advantages. For example, the radix tree serialization format in which the system 100 stores data in the database 102 enables significant space savings compared to previous technologies. For example, embodiments of the database 102 may be ⅔ or more smaller than a database which uses B-trees to store the same data. Embodiments of the present invention have been shown to provide more than a 95% reduction in the space required to store DNS data in comparison to Elasticsearch. The space savings achieved by embodiments of the present invention may be achieved without loss of fidelity.

As mentioned above, the data storage module 106 may serialize the incoming data 104 to the database 102. When performing this serialization, the data storage module 106 may spool data to disk to keep memory usage low, thereby making it possible to index very large datasets on computers with relatively little RAM.

The system 100 may store the incoming data 104 in an append-only manner in the database 102. In other words, the database 102 may be an append-only database, also referred to as a write-once read-many (WORM) database. As a result, records (e.g., radix tries) may not be updated in or deleted from the database 102. This feature of the database 102 confers a variety of benefits. For example:

(5) Data Immutability: In an append-only database, once data is written, it cannot be modified or deleted. This immutability provides a clear audit trail and can be extremely useful in scenarios a verifiable history of all changes is required or desired, such as financial transactions, log files, or version control systems.

(6) Performance: Since data is only appended, not updated or deleted, write operations can be highly optimized and efficient. Furthermore, read operations can be faster because they do not have to deal with issues such as write locks that can slow down access in a read-write database.

(7) Concurrency: Append-only databases can handle high levels of concurrency more effectively. Since they do not need to deal with write conflicts (two processes trying to update the same data at the same time), they can handle many simultaneous read operations without requiring complex concurrency control mechanisms.

(8) Data Recovery: Append-only databases can provide a simple mechanism for data recovery. Since all changes are stored, previous states of the database may be recovered by simply going back to a previous point in the append-only log.

(9) Consistency: Append-only databases provide a higher level of data consistency. Since data is never modified or deleted, once written, the data is consistent for all future reads.

(10) Data Integrity: Since data cannot be overwritten, the risks of data corruption or unintended modifications are significantly reduced.

Furthermore, the total amount of storage required per unit of ingested data in embodiments of the present invention may decrease over time, as the result of data aggregation and deduplication. For example, the size per record and/or association may decrease as more records are added to the database 102. For example, when the database 102 is used to store DNS data, it has been demonstrated that there is a greater than 75% reduction in storage with 7-day aggregation, and a greater than 90% reduction in storage with 31-day aggregation. This results in the database 102 being more space-efficient for large datasets than for small datasets.

In addition, because the database 102 may store data in the form of radix tries, such data does not require balancing. The lack of a need to balance data in the database 102 has a variety of advantages. For example, in general, the process of balancing can add significant overhead to data structures that require it, such as AVL trees or Red-Black trees. After each insert or delete operation, these data structures need to check whether they are still balanced, and if they are not, they have to perform additional operations (such as rotations) to restore balance. In contrast, radix tries (or Patricia tries) do not require this balancing step. The benefits of this include simplicity (because, e.g., of the lack of a need to code and debug the balancing operations), efficiency (because, e.g., each operation on a radix trie does not need to spend extra time checking and restoring balance), and improved prefix searching.

Furthermore, the sorting of radix tries in the database 102 may provide additional advantages. For example, such sorting can simplify and increase the efficiency of searches of data in the database 102. In addition, such sorting can reduce the amount of space required to store radix tries in the database 102 by using a bit compression algorithm which takes advantage of the assumption that the radix trees in the database 102 are sorted.

Because embodiments of the present invention may process the incoming data 104 once to create indexes in the database 102, those indices are very space-efficient and require very little compute to search. This makes the costs of creating and searching the database 102 front-loaded and scale predictably with the amount of data being processed.

The system 100 may store data in the database 102 recursively. For example, the values associated with indexed keys in the database 102 may themselves be radix tries. This makes range queries trivial to implement on multi-dimensional indexes. For example, storing data in this hierarchical way makes it simple to implement queries for domain names, IP addresses, and other hierarchical data types.

The system 100 may recursively store value references in the database 102 in linear runtime as a path through the trie, rather than as an address or offset. This ability is beneficial for large datasets and can be a requirement for particularly large datasets. For example, as the data storage module 106 stores the incoming data 104 into a trie in the database 102 for serialization, it may be desirable to maintain references to related data values, rather than storing the values themselves. One case in which this may be desirable is when creating bidirectional associations between two different values, where one of the values is much longer than the other. As a concrete example, consider creating bidirectional associations between an Ipv4 address, which has a fixed length of 4 bytes, and a domain name, which may have a length of up to 255 bytes.

To create such references to related data values, even if bidirectional associations are desired, the data storage module 106 may create and store only one association immediately in the database 102 during the data loading process: the mapping of the lengthier keys to their corresponding values. After all of the keys have been inserted into the first association trie, as that trie (which contains the first half of the bidirectional associations) is being serialized, the data storage module 106 may create and store in the database 102 a second trie containing the other half of the bidirectional associations.

In such embodiments, the data storage module 106 may generate the data that is inserted into the second trie by visiting every node of the first trie during serialization. The keys that are inserted into the second trie are the values stored at every node in the first trie. However, the values that are inserted into the second trie are not the key in the first trie. Instead, they are the path indexes that are required to be traveled to reconstruct the key stored in the first trie. The serializer only needs to store such "directions" to reconstruct the key as it travels the paths on the first trie, because the serializer is aware of its current absolute path to every node in the trie as a sequence of indexes into the next level of children (e.g., [123, 250, 16, 1]). The second trie is thus able to store values as path instructions rather than the whole value, thereby effectuating compression at the expense of needing to walk the first trie to reconstruct the full value stored at each node of the first trie.

Embodiments of the present invention have flexible support for near-arbitrary key lengths. For example:
(1) keys in the database 102 may be very large (e.g., 16 MB or greater in length);
(2) keys in the database 102 may have any number of bytes, including zero;
(3) different keys in the database 102 may have different lengths;
(4) keys in the database 102 may have arbitrary null bytes.

When the query module 108 queries the database 102 using the query 110 to produce the query results 112, the resulting keys may be ordered in strictly-increasing order in the query results 112. This may enable the query results 112 to be processed (e.g., filtered) more efficiently than if the keys were not in strictly-increasing order. Furthermore, the fact that keys are stored in strictly-increasing locations on disk in the database 102 reduces disk seek fragmentation during queries.

The indexes stored by the system 100 in the database 102 can be efficiently read from disk or remote blob storage (e.g., AWS S3), thereby eliminating the need for dedicated compute hardware for handling queries against the index, which results in significantly simpler database topologies. This also allows for more efficient reads from spinning magnetic media, which suffer more from random access, than approaches which require random seeking to match indexes.

Another advantage of embodiments of the present invention is that they do not require sharding of data. Sharding is a technique used in database management systems to horizontally partition data across multiple servers or nodes in a distributed system. It is primarily employed to improve the scalability, performance, and availability of databases when dealing with large volumes of data. In a sharded database, data is divided into smaller subsets called shards. Each shard contains a distinct portion of the dataset. Sharding allows distributing the data and workload across multiple servers, enabling parallel processing and reducing the load on individual nodes. This approach allows the database system to handle larger datasets and higher traffic loads compared to a single, monolithic database. Sharding, however, has a variety of drawbacks. For example, in general, sharding makes deployment more complicated. Sharding often requires duplicating architecture, and then implementing logic that directs ingestion and querying to the correct cluster for servicing. As another example, if the wrong shard size is selected initially and the deployment subsequently grows beyond the capacity of that shard size, this can cause architectural and data migration problems.

Embodiments of the system 100 may store extremely high-cardinality indexes in the database 102 with comparatively little resource usage, thereby eliminating the need for sharding of keys, and thereby avoiding the drawbacks of sharding noted above. For example, the indexed keys in the database 102 may be greater than 1 billion, greater than 10 billion, greater than 100 billion, greater than 500 billion, greater than 1 trillion, greater than 5 trillion, or greater than 10 trillion.

Another benefit of embodiments of the present invention is that they do not have any limits on the number of keys or records in the database 102, unlike many other commercially-available systems. For example, the MongoDB system cannot store more than 4 TB on a single deployment without sharding. Embodiments of the present invention do not have such limits, because they can be backed by "bottomless storage" options, such as AWS S3.

Yet another benefit of embodiments of the present invention is that they can serve data from the database 102 off-disk, without using standby compute resources. This enables extremely low cost data access for infrequent access patterns.

Embodiments of the present invention also enable queries to search for ranges (and sub-ranges) of keys, e.g., "find all the *.synology.me domains in this/8 CIDR", because such queries may be implemented using simple prefix matches. Because domain names may be reversed when stored in the database 102, and because CIDRs may share common bit prefixes, all values under those prefixes may match during a single query of the database 102.

Yet another advantage of embodiments of the present invention is that they are agnostic to the compute and storage resources that are used to implement components of the system 100, such as the database 102. This provides a significant degree of flexibility in the choice of compute and storage resources, and in the ability to swap out such resources over time in response to changing requirements.

Boilerplate

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention ingest, process, and store data in a database in the form of sorted radix tries, and query such data to retrieve and output query results. Such functions are inherently rooted in computer technology and cannot be performed mentally or manually, particularly in connection with the massive datasets that can be processed using embodiments of the present invention.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

Although terms such as "optimize" and "optimal" are used herein, in practice, embodiments of the present invention may include methods which produce outputs that are not optimal, or which are not known to be optimal, but which nevertheless are useful. For example, embodiments of the present invention may produce an output which approximates an optimal solution, within some degree of error. As a result, terms herein such as "optimize" and "optimal" should be understood to refer not only to processes which produce optimal outputs, but also processes which produce outputs that approximate an optimal solution, within some degree of error. Similarly, terms such as "maximize" and "maximal," as used herein, do not necessarily refer to values that are greater than all other actual or possible values (e.g., of a particular parameter), but instead may include values that are greater than some previous value(s), e.g., by a particular amount, or values that are higher than would be achieved by one or more other methods under the same or similar conditions. Similarly, terms such as "minimize" and "minimal," as used herein, do not necessarily refer to values that are lower than all other actual or possible values (e.g., of a particular parameter), but instead may include values that are lower than some previous value(s), e.g., by a particular amount, or values that are lower than would be achieved by one or more other methods under the same or similar conditions.

What is claimed is:

1. A method performed by at least one computer process executing computer program instructions stored in at least one non-transitory computer-readable medium, the method comprising:

(A) storing input data, comprising a plurality of keys, in a sorted radix trie in an append-only database, the storing comprising:
  (A) (1) creating a root node of the sorted radix trie;
  (A) (2) for each key K in the plurality of keys, configuring a node structure of the sorted radix trie based on the key K; and
  (A) (3) storing the plurality of keys in a sorted order and with strictly increasing offsets in serialized form in the sorted radix trie in the append-only database, comprising storing, for each node N in the sorted radix trie in the append-only database, an array of offsets from a location of node N to locations of node N's child nodes.

2. The method of claim 1, wherein the input data further comprises a plurality of values associated with the plurality of keys.

3. The method of claim 2, wherein (A) (3) comprises storing the plurality of keys and the plurality of values in a sorted order and serialized form in the sorted radix trie in the append-only database.

4. The method of claim 2, wherein at least one of the plurality of values comprises a trie.

5. The method of claim 1, wherein the input data comprises a plurality of Internet Protocol (IP) addresses.

6. The method of claim 1, wherein the input data comprises a plurality of Domain Name Service (DNS) entries.

7. The method of claim 1, wherein configuring the node structure of the sorted radix trie based on the key K comprises creating or modifying the node structure of the sorted radix trie in a random access memory of a computer.

8. The method of claim 7, wherein configuring the node structure of the sorted radix trie based on the key K comprises:
  determining whether more than some minimum threshold number of keys has been added to the sorted radix trie; and
  in response to determining that more than the minimum threshold number of keys has been added to the sorted radix trie, storing any remaining keys in an overflow file on a disk.

9. The method of claim 1, wherein (A) (3) comprises storing, for each node N in the sorted radix trie in the append-only database, a count of immediate child nodes of the node N.

10. The method of claim 1, wherein (A) (3) comprises storing, for each node N in the sorted radix trie in the append-only database, an array of prefixes of all child nodes of the node N.

11. The method of claim 10, wherein storing the array of prefixes comprises storing the array of prefixes using prefix compression.

12. The method of claim 10, wherein storing the array of prefixes comprises storing the array of prefixes in strictly-increasing order using bit compression.

13. The method of claim 1, wherein storing the array of offsets comprises storing the array of offsets in strictly-increasing order using prefix compression.

14. The method of claim 1, wherein storing the array of offsets comprises storing the array of offsets using bit compression.

15. The method of claim 1, wherein (A) (3) comprises storing, for each child node C of each node N in the sorted radix trie in the append-only database, child node data comprising at least one of data indicating whether node C is a branch node, whether node C has a radix, or whether the child node is a terminating node.

16. The method of claim 1, wherein storing the child node data comprises storing the child node data using bit compression.

17. The method of claim 1, further comprising:
  (B) receiving a query;
  (C) determining whether any of the plurality of keys in the sorted radix trie in the append-only database matches the query, comprising traversing keys in the sorted radix trie in order on disk until a match of the query is found or until the sorted radix trie has been traversed without finding a match.

18. A system comprising at least one non-transitory computer-readable medium having computer program instructions stored thereon, the computer program instructions being executable by at least one computer processor to perform a method, the method comprising:
  (A) storing input data, comprising a plurality of keys, in a sorted radix trie in an append-only database, the storing comprising:
  (A) (1) creating a root node of the sorted radix trie;
  (A) (2) for each key K in the plurality of keys, configuring a node structure of the sorted radix trie based on the key K; and
  (A) (3) storing the plurality of keys in a sorted order and strictly increasing serialized form in the sorted radix trie in the append-only database, comprising storing, for each node N in the sorted radix trie in the append-only database, an array of offsets from a location of node N to locations of node N's child nodes.

* * * * *